(12) United States Patent
Wolff-Petersen et al.

(10) Patent No.: US 9,454,297 B2
(45) Date of Patent: Sep. 27, 2016

(54) NAVIGATION DEVICE AND METHODS THEREOF

(75) Inventors: Jacob Wolff-Petersen, Copenhagen N. (DK); Tino Soelberg, Copenhagen (DK)

(73) Assignee: STEELSERIES ApS, Frederiksberg (DK)

( * ) Notice: Subject to any disclaimer, the term of this patent is extended or adjusted under 35 U.S.C. 154(b) by 1174 days.

(21) Appl. No.: 12/483,678

(22) Filed: Jun. 12, 2009

(65) Prior Publication Data

US 2010/0315340 A1 Dec. 16, 2010

(51) Int. Cl.
*G06F 3/0484* (2013.01)
*G06F 3/0354* (2013.01)

(52) U.S. Cl.
CPC ....... *G06F 3/04847* (2013.01); *G06F 3/03543* (2013.01)

(58) Field of Classification Search
CPC .. G06F 3/03543; G06F 3/038; G06F 3/0383; G06F 3/04847; G06F 3/0238; G06F 2203/0337; G06F 2203/0384; A63F 13/31; A63F 2300/6045
USPC .......................... 345/156–157, 161, 163, 168
See application file for complete search history.

(56) References Cited

U.S. PATENT DOCUMENTS

| | | | | |
|---|---|---|---|---|
| 5,963,195 A | * | 10/1999 | Gregg | G06F 1/1616 345/159 |
| 6,424,357 B1 | * | 7/2002 | Frulla et al. | 715/728 |
| 6,980,175 B1 | * | 12/2005 | Narayanaswami | G06F 3/03543 345/156 |
| 7,215,323 B2 | * | 5/2007 | Gombert et al. | 345/157 |
| 2004/0046735 A1 | * | 3/2004 | Gombert | G06F 3/0338 345/156 |
| 2006/0028449 A1 | * | 2/2006 | Ranta | 345/163 |
| 2007/0132733 A1 | * | 6/2007 | Ram | 345/163 |
| 2009/0144621 A1 | * | 6/2009 | Sangster | G06F 3/0383 715/704 |
| 2011/0084904 A1 | * | 4/2011 | Tan | 345/163 |

FOREIGN PATENT DOCUMENTS

JP 06102998 A * 4/1994

OTHER PUBLICATIONS

Genius Europe GMBH, "Ergo 555 Laser", 3-page article; http://www.genius-europe.com/en/produktdetail.php? ID2=29&ID=24&ID3=401; Web site last visited Jun. 1, 2009.

(Continued)

*Primary Examiner* — Matthew Fry
(74) *Attorney, Agent, or Firm* — Guntin & Gust, PLC; Joseph Hrutka

(57) ABSTRACT

A system that incorporates teachings of the present disclosure may include, for example, a computer mouse having a tracking device to navigate in a graphical user interface presented by a software application or control aspects thereof, a plurality of buttons, a scroll wheel, a display, a memory, and a controller coupled to the tracking device, the plurality of buttons, the display, and the memory. The controller can be operable to present by way of the display a plurality of scrollable options to program a corresponding plurality of operational parameters of the computer mouse, detect from a tactile contact of at least one of one or more of the plurality of buttons and the scroll wheel a selection from the plurality of options, store in the memory the selection, and operate at least one of the plurality of operational parameters of the computer mouse according to the stored selection. Additional embodiments are disclosed.

15 Claims, 6 Drawing Sheets

(56) References Cited

OTHER PUBLICATIONS

Logitech, "G5 Laser Mouse", 3-page article; http://www.logitech.com/index.cfm/mice_pointers/mice/devices/359&cl=US,EN; Web site last visited Jun. 1, 2009.

Microsoft, "SideWinder™ X5 Mouse", 1-page article; http://www.microsoft.com/hardware/gaming/ProductDetails.aspx?pid=101; Web site last visited Jun. 1, 2009.

Microsoft, "SideWinder™ X5 Mouse", 2-page article; http://www.microsoft.com/hardware/gaming/ProductDetails.aspx?pid=101&active_tab=syst . . . ; Web site last visited Jun. 1, 2009.

Microsoft, "SideWinder™ X5 Mouse", 13-page article; http://www.lanoc.org/reviews/microsoft.sidewinder-x5-mouse/; Web site last visited Jun. 1, 2009.

Steelseries, "Ikari Laser", 2-page article; http://www.steelseries.com/int/products/mice/ikari_laser/information; Web site last visited Jun. 1, 2009.

\* cited by examiner

200

NAVIGATION DEVICE AND METHODS THEREOF

FIELD OF THE DISCLOSURE

The present disclosure relates generally to navigation devices operable with computing devices, and more specifically to a navigation device and methods thereof.

BACKGROUND

It is common today for users of navigation devices such as a computer mouse or controller for a gaming console to demand more out of these devices than ever before. This is especially true for users who are avid users of computer games, online games, or gaming consoles. Gamers can choose a navigation device for its ergonomics, precision to navigate, speed of navigation, and so on.

DETAILED DESCRIPTION

One embodiment of the present disclosure entails a computer mouse having a tracking device to navigate in a graphical user interface presented by a software application or control aspects thereof, a plurality of buttons, a scroll wheel, a display, a memory, and a controller coupled to the tracking device, the plurality of buttons, the display, and the memory. The controller can be operable to present by way of the display a plurality of scrollable options to program a corresponding plurality of operational parameters of the computer mouse, detect from a tactile contact of at least one of one or more of the plurality of buttons and the scroll wheel a selection from the plurality of options, store in the memory the selection, and operate at least one of the plurality of operational parameters of the computer mouse according to the stored selection.

Another embodiment of the present disclosure entails a computer-readable storage medium in a navigation device having computer instructions to present on a display of the navigation device a plurality of programmable options corresponding to a plurality of operational parameters of the navigation device, detect a selection from the plurality of programmable options, and navigate in a graphical user interface presented by a software application or control aspects of the software application according to the selection.

Yet another embodiment of the present disclosure entails presenting a menu for programming at least one of a plurality of operational features of a navigation device, programming at least one of the plurality of operational features of the navigation device responsive to a detected selection from the menu, and navigating in a graphical user interface presented by a software application or controlling aspects of the software application according to the at least one operational feature programmed in the navigation device.

Figure 1:
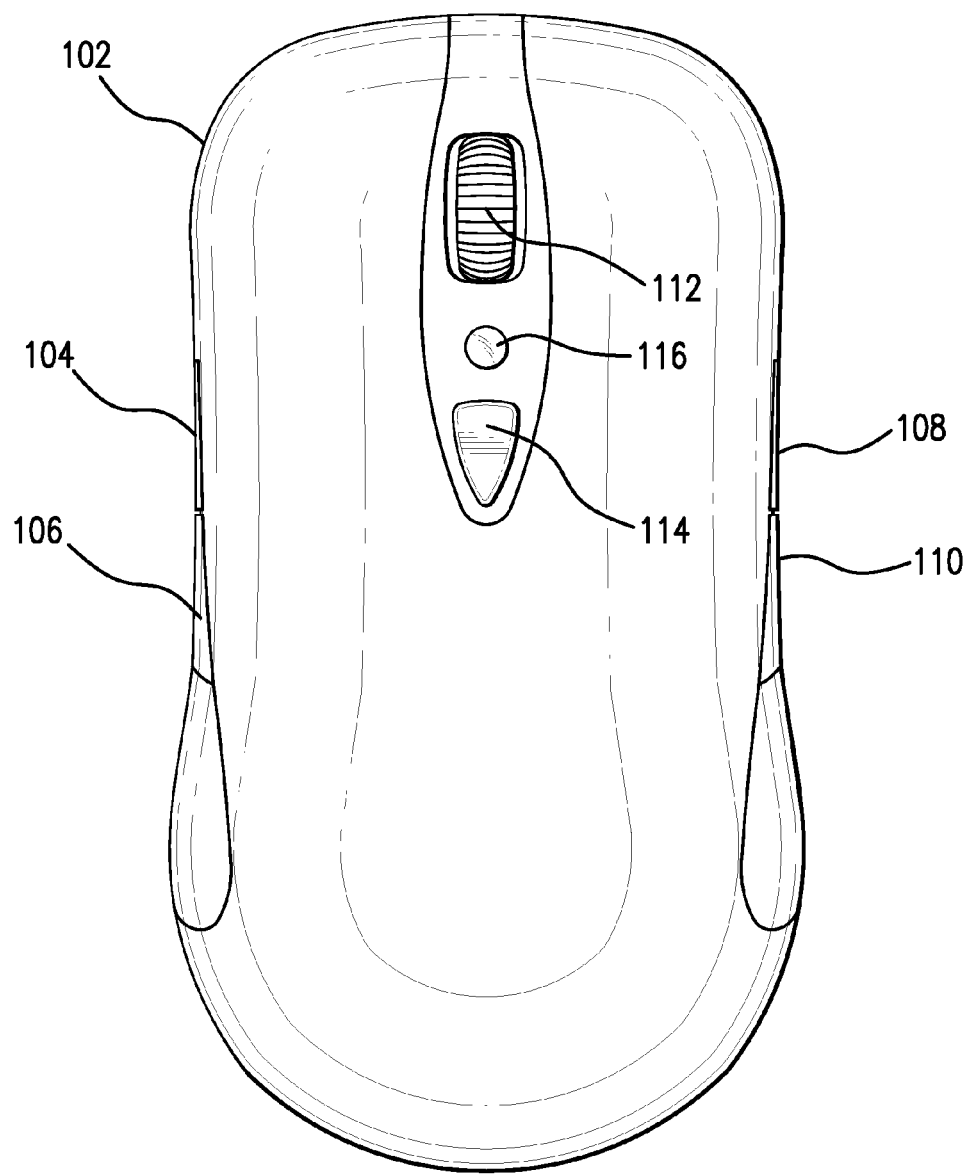
FIG. 1 depicts an illustrative embodiment of a navigation device in the form of a mouse.

FIG. 1 depicts an illustrative embodiment of a navigation device 100 in the form of a computer mouse. The navigation device 100 can be housed in a housing assembly 102 with common materials such as plastics having a form factor that can be ergonomically desirable to users. The navigation device 100 in the present illustration has five depressible buttons. One set of buttons 104, 106 are on the left-side of the navigation device 100, and another set of equal number 108, 110 are on the right-side of the navigation device 100. The fifth button 114 is at a top surface of the navigation device 100 near a light-emitting device 116 and a scroll wheel 112.

Figure 2:
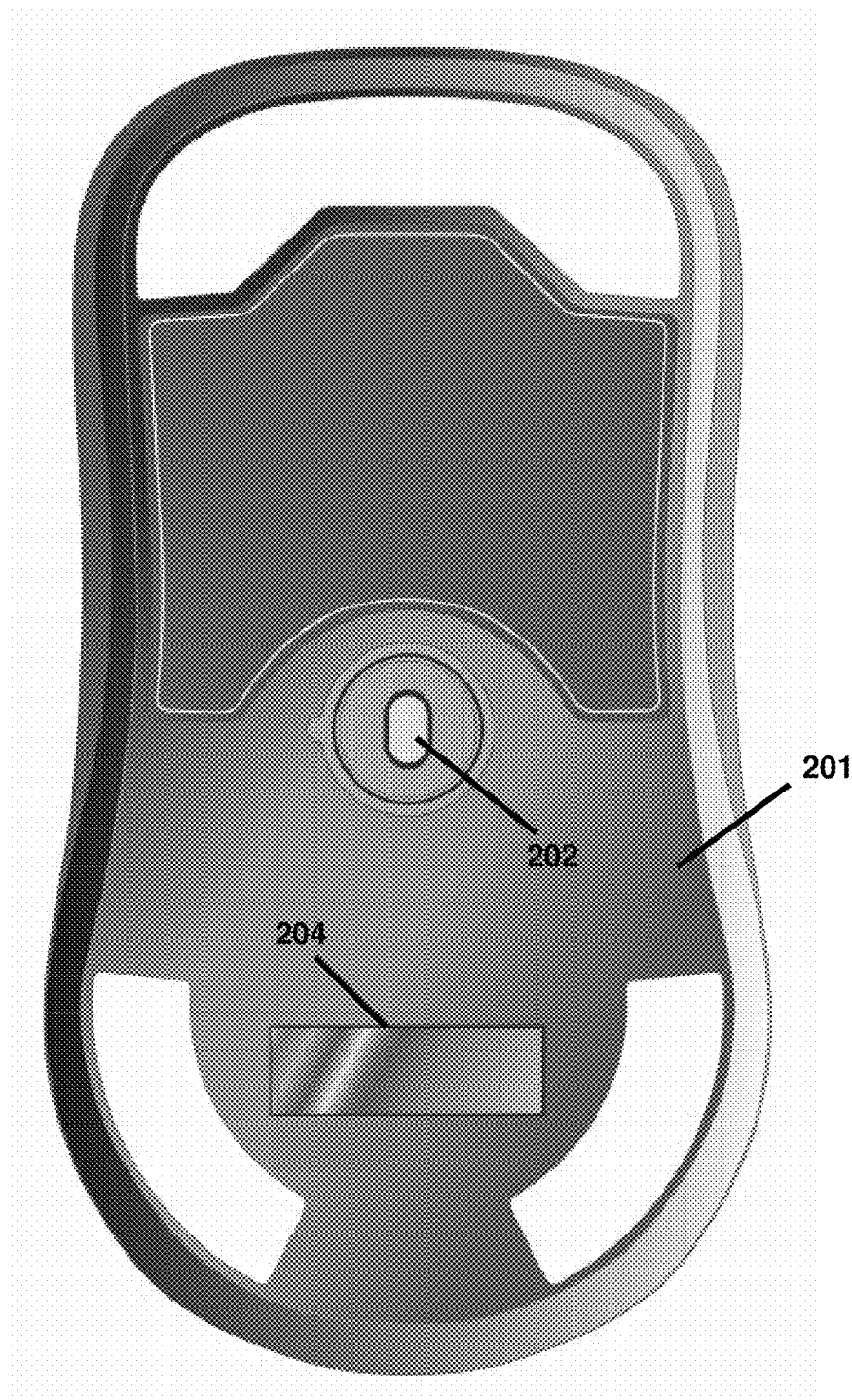
FIG. 2 depicts an illustrative embodiment of a bottom view of the navigation device of FIG. 1.
Figure 3:
FIGS. 3-4 depict illustrative embodiments of perspective views of the navigation device of FIG. 1.
Figure 4:

FIG. 2 depicts an illustrative embodiment of a bottom view 200 of the navigation device 100. The bottom surface 201 of the housing assembly 102 of the navigation device 100 is flat so that it can be flush with a corresponding surface that the navigation device 100 makes contact with. On the bottom side of the navigation device 100, the navigation device 100 includes a tracking device 202 and a display 204. The tracking device 202 can track the movements of the navigation device 100 on a surface. The display 204 can present a user a user interface for conveying information for interacting with the user as will be discussed shortly. FIGS. 3-4 depict illustrative embodiments of perspective views of the navigation device 100.

Figure 5:
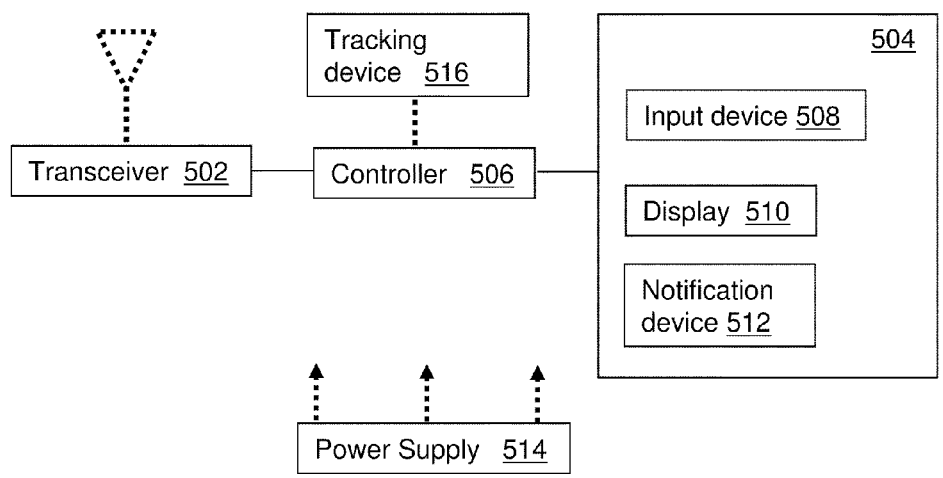
FIG. 5 depicts an illustrative embodiment of a block diagram of components operating in the navigation device of FIG. 1.

FIG. 5 depicts an illustrative embodiment of a block diagram 500 of components operating in the navigation device 100. The navigation device 100 can comprise a transceiver 502, a user interface (UI) 504, a power supply 514, a tracking device 516, and a controller 506 for managing operations thereof. The transceiver 502 can support a wireline interface such as a version of a Universal Serial Bus (USB) interface. Other common wireline interfaces (such as Firewire and Ethernet) or proprietary wireline interfaces are contemplated by the present disclosure. In this embodiment, the navigation device 100 is tethered for example with a flexible USB cable to a computing device such as a laptop or desktop computer. The transceiver 502 can be adapted to support wireless communications also. In this latter embodiment, the transceiver 502 can utilize commonly available technology to support wireless access technologies such as Bluetooth or Wireless Fidelity (WiFi). Other common wireless interfaces (such as Zigbee) or proprietary wireless interfaces are contemplated by the present disclosure.

The UI 504 can include an input device 508. The input device 508 can comprise depressible, touch-sensitive buttons or combinations thereof. Such buttons can be represented by buttons 104, 106, 108, 110 and 114. The input device 508 can also include a navigation mechanism such as the scroll wheel 112. The input device 508 can be an integral part of the housing assembly 102 of the navigation device 100 as shown in FIGS. 1-4. In another embodiment where the navigation device 100 has a form factor other than shown in FIGS. 1-4, the input device 508 can represent an independent device tethered or wireless coupled to the navigation device 100.

The UI 504 can further include a display 510 such as monochrome or color LCD (Liquid Crystal Display), OLED (Organic Light Emitting Diode) or other suitable display technology for conveying images such as a menu for programming operational parameters of the navigation device 100. The display 510 can also use touch-sensitive display technology. In this latter embodiment, the display 510 can present a menu system which can be managed by tactile touch of a finger or stencil which can be inserted or removed from the housing assembly 102 of the navigation device 100. A stencil is not shown in FIGS. 1-4 but is contemplated by the present disclosure.

The UI 504 can also include a notification device 512. The notification device 512 can use common illumination technology such as an LED or OLED (shown as reference 116 in FIGS. 1-3) to inform a user of an operational state of the navigation device 100. The notification device 512 can be adapted to present two or more states of operation by way of light and/or color illumination. For example, the notification device 512 can have two states of operation: light on, light off. In another embodiment, the notification device 512 can have four states of operation: light off, light in yellow, light in amber, and light in red. The notification device 512 can be adapted to notify a user of any number of states of operation of the navigation device 100.

The power supply 514 can utilize common power management technologies such as replaceable and rechargeable batteries, supply regulation technologies, and charging system technologies for supplying energy to the components of the navigation device 100. In one embodiment the charging system can utilize external power sources such as a tether charger (such as a DC transformer) or a wireless inductive charger. In another embodiment, the charging system can utilize kinetic power charging technology, and/or solar cell charging technology integrated in the navigation device 100. Other power supply technologies suitable to the present disclosure are contemplated.

The tracking device 516 can utilize common laser sensing technology to track movement of the navigation device 100 on a surface such as a mouse pad. The controller 506 can utilize computing technologies such as a microprocessor, a digital signal processor (DSP), and/or an Application Specific Integrated Circuit (ASIC) operably coupled to memory such a Flash, ROM, RAM, SRAM, DRAM or combinations thereof.

Other components not shown in FIG. 5 are contemplated by the present disclosure. For instance, the navigation device 100 can further include a reset button (not shown) flush with the bottom side of the housing assembly 102 as depicted in FIG. 2. The reset button can be used to reset the controller 506 of the navigation device 100. In yet another embodiment, the navigation device 100 can also include a factory default setting button positioned below a small hole in the housing assembly 102 to force the navigation device 100 to re-establish factory settings. In this embodiment, a user can use a sharp object such as a pen to reach into the hole and depress the default setting button.

Figure 6:
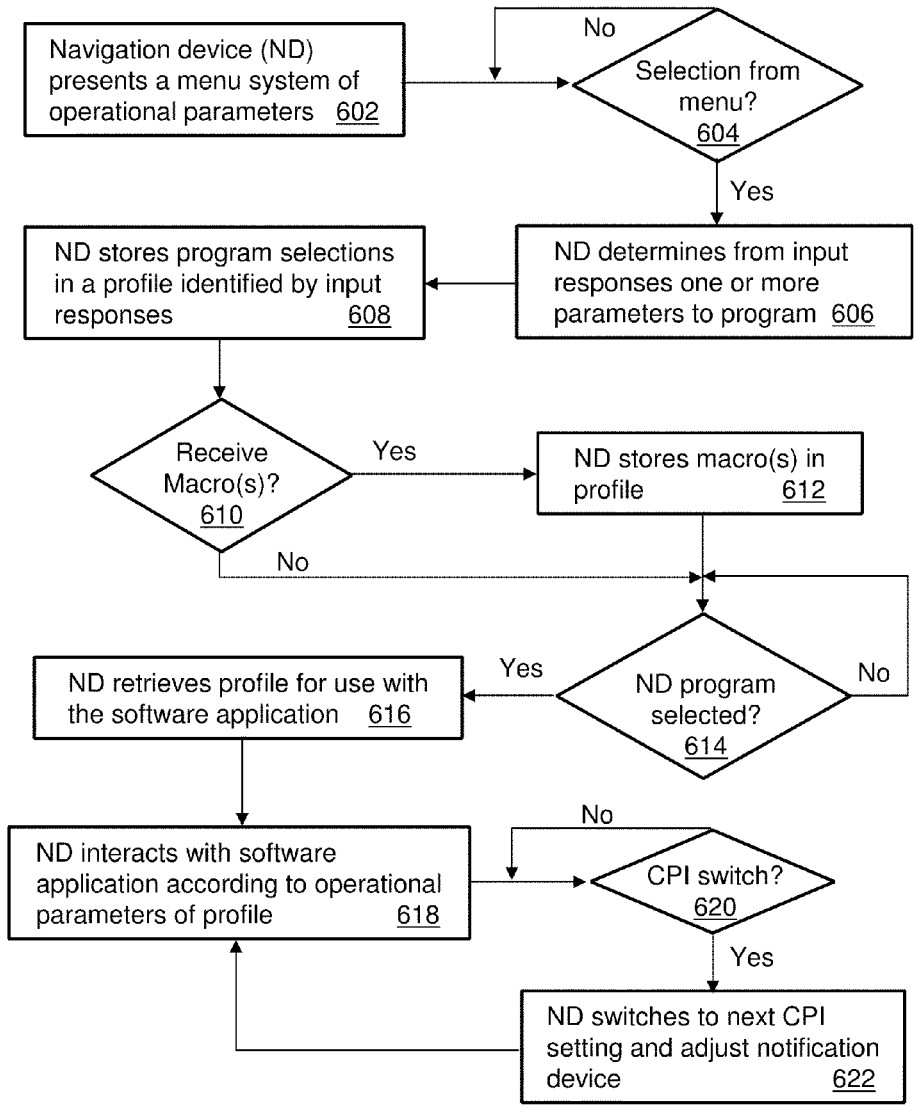
FIG. 6 depicts an illustrative method operating in the navigation device of FIG. 1.

FIG. 6 depicts an illustrative method 600 operating in the navigation device 100. Method 600 can represent combinations of software and hardware operations taking place in the components of FIG. 5. With this in mind, method 600 can begin with the navigation device 100 presenting in step 602 a menu system of operational parameters of the navigation device 100. The menu system can be presented by way of the display 510. The menu system can present a user of the navigation device 100 a plurality of programmable options to control the operating parameters of the navigation device 100. The operating parameters can include without limitation:

a movement count resolution parameter for navigating in a graphical user interface (GUI) presented by a software application such as an operating system, a video game, or otherwise. The software application in the present context can be operating in a computing device or can be accessible to the computing device that is communicatively coupled to the navigation device 100;

a parameter to control line straightening when navigating in the GUI;

a parameter to control jitter correction when navigating in the GUI;

a parameter to control frequency of reports sent to the computing device;

a parameter to control navigation acceleration in the GUI;

a parameter to select or store one or more profiles;

a parameter to control one or more presentation settings of the display 510 such as brightness, contrast, etc.;

a parameter to select between a right-handed or left-handed setting for a portion of the plurality of buttons (making the navigation device 100 of FIG. 1 ambidextrous); and/or a parameter to control a speed setting for scrolling in the GUI with the scroll wheel.

Other parameters suitable for managing operations of the navigation device 100 are contemplated by the present disclosure.

In the foregoing embodiments, the computing device can represent a laptop or desktop computer, a gaming console, or any other suitable computing device which can accept instructions from the navigation device 100. The movement count resolution parameter referred to above can define a movement count reported to the computing device. The move count can be used by the software application to navigate in the GUI presented thereby as a function of a unit of movement of the navigation device 100 on a surface detected by way of the tracking device 516. One form of a movement count resolution parameter can be a Count Per Inch (CPI) parameter.

In one embodiment the CPI parameter can be defined by a user with a range from 1 to 5001. A setting of 1 means that the navigation device 100 reports to the computing device a single movement count for each detectable inch the navigation device 100 moves across a surface such as a mouse pad. A single movement count can represent a movement across a fixed number of display pixels. Accordingly the lower the CPI number, the higher the resolution in navigating a GUI. On the other hand, as the CPI number is raised to a higher setting more movement counts are reported to the computing device per inch of movement by the navigation device 100—hence, a lower resolution for navigating a GUI. Another form of a movement count resolution parameter can be a Dots Per Inch (DPI) parameter. Other parameters suitable for defining a movement count resolution are contemplated by the present disclosure.

Referring back to FIG. 6, the assortment of menu options presented by the navigation device 100 by way of the display 510 in step 602 can be navigated by selecting one or more of the buttons 104, 106, 108, 110, 114 and/or the scroll wheel 112 while a user holds the navigation device 100 with the bottom side up (as shown in FIG. 2). When a selection is detected in step 604 by the navigation device 100 by way of one of the elements of the input device 508, the navigation device 100 can proceed to step 606 where it can determine from the input responses detected by the input device 508 one or more operating parameters (such as described above) for programming the navigation device 100. In step 608, the navigation device 100 can store the program selections in a profile which can be identified in the input response. The profile can include any combination of programmed operating parameters which the user has defined in step 606. The profile can also be associated with a particular software application or can be selected by the user from the menu system for use with a software application (e.g., video game operating in the computing device or on-line).

The navigation device 100 can be tethered to a computing device (such as a computer, gaming console or otherwise) to receive in step 610 macros generated by a user by way of a macro generation software operating in the computing device. The macro generation software can record a sequence of button or keystrokes, speech commands, and/or navigation movements (collectively accessory stimuli) from one or more accessories coupled to the computing device.

An accessory in the present context can mean a keyboard, a joystick, a gaming console controller, a computer mouse, a headset, or other common accessories used with a computing device. The navigation device 100 can also serve as one of the accessories where a sequence of button depressions and navigation movements can be recorded. The sequence of accessory stimuli recorded from any of these accessories coupled to the computing device can be converted into one or more macros which can direct operations of a software application such as for example, without limitation, a gaming application which is controllable by the navigation device 100. The computing device can also record in the macro the timing of how the sequence of accessory stimuli is created.

Once a macro is generated, it can be transmitted by the computing device to the navigation device 100 for later use. The macro can be stored in a profile in step 612, and can be associated with one or more buttons (or combination of buttons) or other manipulations (e.g., rapid shaking on a surface or a specific movement such as a circle) of the navigation device 100 to be invoked at a later time when utilizing the navigation device 100 to navigate and/or control operations of a software application communicatively coupled to the navigation device 100 by way of the computing device tethered by a USB cable or wireless interface.

Once one or more operational parameters of the navigation device 100 have been programmed along with one or more macros, the navigation device 100 can await in step 614 a selection of these programmed parameters individually or in a profile for use with a software application chosen by the user. The selection of individual parameters or a profile can take place by way of the menu system described earlier with the exception that at this step, the user would be selecting a program setting previously performed by the user.

Once a selection is detected in step 614, the navigation device 100 can proceed to step 616 where it retrieves from the memory of the navigation device 100 the profile (or alternatively individual programmed settings) for use with the desired software application (e.g., an online game such as World of War Craft, or a game operating in a gaming console, etc.). Once these programming options have been retrieved, the navigation device 100 can begin to invoke these options in step 618 while interacting with the computing device from which the navigation device 100 can access the desired software application.

In step 620, the navigation device 100 can be further programmed to monitor a request by way of button 114 of FIG. 1 to switch between CPI (or DPI) settings when depressed. If a depression is detected, the navigation device 100 can proceed to step 622 where it changes the CPI setting and adjusts the notification device 512 (illustrated by LED 116 of FIG. 1) to inform the user of the change. The navigation device 100 then proceeds to step 618 where it continues interacting with the software application. In the present illustration, the navigation device 100 can provide two states for CPI manipulation in step 622: a high CPI for low resolution (LED off), or low CPI for high resolution (LED on), which can be toggled by selecting button 114. The high and low CPI settings can be programmed by a user and stored in a profile as described above. More than two states can be achieved. For example the LED can toggle between a yellow, amber, red sequence to indicate a low, mid, and hi CPI. Additional implementations are possible and contemplated by the present disclosure.

Method 600 describes a technique for programming operational parameters of a navigation device 100 without assistance from a computing device communicatively coupled thereto. In an embodiment where the navigation device 100 represents a computer mouse, the computer mouse in accordance with method 600 can be said to be driver independent. That is, the computer mouse has a plurality of options to program operational parameters that control the function of the computer mouse without programming assistance of an external computing device such as a desktop computer. Accordingly, a user of such a computer mouse can easily port user-programmed features of this device between computers without having to establish settings in an operating system, or a software application such a gaming application. Such portability provides the user the flexibility of interacting with software applications on any computing device with ease, and timeliness.

From the foregoing descriptions, it would be evident to an artisan with ordinary skill in the art that the aforementioned embodiments can be modified, reduced, or enhanced without departing from the scope and spirit of the claims described below. As has been noted on several occasions above, the navigation device 100 can represent any device that can control navigation and/or aspects of a software application operating in a computing device. Accordingly, the navigation device 100 can represent singly or combination a keyboard, a joystick, a computer mouse, a gaming console controller, a headset, or any other form of accessory that can have an effect on a software application communicatively coupled to and controllable by the navigation device 100. Additionally, a computing device can represent a gaming console, a computer, a cellular phone, a personal digital assistant, or any other suitable computing and communication technology available at present or in the future which can be controlled in part by the navigation device 100.

Method 600 can be adapted so that the presentation functionality of the navigation device 100 can be extended by presentation resources of a computing device (such as a computer, cellular phone, otherwise) communicatively coupled to the navigation device 100 without transferring programming control to the computing device. In this embodiment the computing device can share its presentation resources such as a larger display and audio system with the navigation device 100. Accordingly, while programming the navigation device 100, the menu presented by the navigation device 100 can for example be displayed on a display of the computing device in addition to or in place of the display of the navigation device 100. The same can be said of the audio system if one is used. In the foregoing embodiments, however, the control and programming of the navigation device 100 remains with the navigation device 100 without utilizing the processing resources of the computing device. Hence, the navigation device 100 maintains its independence in directing the programming of its operational parameters without transferring control to the computing device.

In yet another embodiment, method 600 can be applied to a navigation device 100 in the form of a headset. The headset in this illustration can represent two speakers which can be positioned on the ears of a user. The headset can also include a microphone to detect audible stimuli such as speech from the user of the headset. In this embodiment, the headset can be programmed to perform the functions of method 600. That is, it can present a selectable menu (audibly, visually or both) to program operating parameters of the headset. The headset can record macros such as speech commands, and/or stimuli received from other accessories (e.g., keyboard, computer mouse, etc.). Once one or more operating parameters of the headset are programmed according to the illustrative steps of method 600, the headset can be ported between computing devices (gaming consoles, personal computers, etc.) operating any type of controllable software application (operating system, word processing, gaming applications, on-line applications, etc.).

Other suitable modifications can be applied to the present disclosure. Accordingly, the reader is directed to the claims for a fuller understanding of the breadth and scope of the present disclosure.

Figure 7:
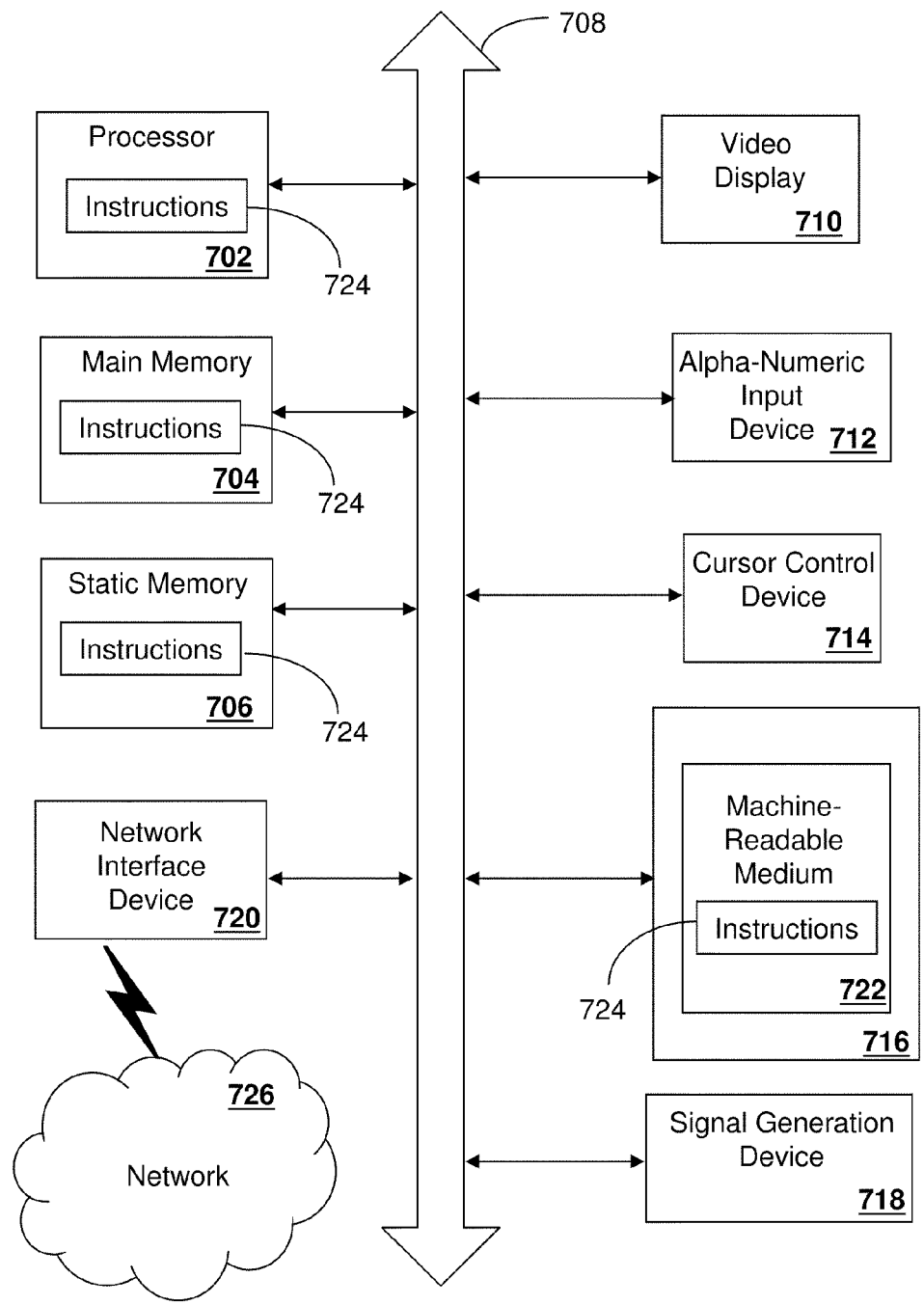
FIG. 7 depicts an illustrative diagrammatic representation of a machine in the form of a computer system within which a set of instructions, when executed, may cause the machine to perform any one or more of the methodologies disclosed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer mouse, comprising:
a tracking device to control navigation in a graphical user interface presented by any one of a plurality of software applications controllable by the computer mouse;
a plurality of buttons;
a scroll wheel;
a display;
a memory that stores computer instructions; and
a controller coupled to the tracking device, the plurality of buttons, the display, and the memory, wherein the controller, responsive to executing the computer instructions, performs operations comprising:
assigning one or more operational parameters to a first profile of a plurality of profiles stored in the memory, wherein the one or more operational parameters control operations of the computer mouse, and wherein the one or more operational parameters comprise at least one of a movement count parameter affecting operations of the computer mouse, a line straightening parameter affecting operations of the computer mouse, a jitter correction parameter affecting operations of the computer mouse, a navigation acceleration parameter affecting operations of the computer mouse, or any combination thereof;
presenting, by way of the display, a plurality of scrollable options to receive a selection of one of the plurality of profiles to select program settings for the computer mouse without assistance from a computer device communicatively coupled to the computer mouse;
detecting a selection of the first profile from the selection of one of the plurality of profiles;
storing in the memory the selection;
programming the computer mouse according to the one or more operational parameters of the first profile to control operations of the computer mouse while a software application is in use by the computer device, wherein the computer device controls aspects of the software application according to the operations of the computer mouse configured according to the first profile;
receiving from the computer device a sequence of at least one of one or more keystrokes, one or more navigation commands, or one or more speech commands, wherein the sequence corresponds to a macro;
associating the macro with at least one of one or more of the plurality of buttons, the scroll wheel, or combinations thereof;
storing the macro and its association in the memory of the computer mouse;
monitoring for a resolution change request to change a resolution setting of the tracking device; and
adjusting the resolution setting of the tracking device according to the resolution change request.

2. The computer mouse of claim 1, wherein the one or more operational parameters further comprise at least one of:
a control frequency parameter that affects operations of the computer mouse by adjusting a frequency of reports sent by the computer mouse to the computer device; or
a speed setting parameter that affects operations of the computer mouse by adjusting a scrolling speed of the scroll wheel of the computer mouse.

3. The computer mouse of claim 1, wherein the tracking device is a laser sensing device.

4. The computer mouse of claim 1, wherein the operations further comprise:
detecting a tactile selection of one or more of the plurality of buttons;
transitioning between the operational parameters responsive to said detection; and
adjusting operations of the computer mouse according to the transition.

5. The computer mouse of claim 1, wherein the operations further comprise:
receiving input associated with a selection of at least one of the one or more of the plurality of buttons, the scroll wheel, or combinations thereof;
detecting from the input the association with the macro;
retrieving the sequence associated with the macro from the memory; and
transmitting the sequence to the computer device.

6. The computer mouse of claim 1, wherein the computer mouse is tethered by wire to a port of the computer device.

7. A non-transitory computer-readable storage medium, comprising computer instructions which, responsive to being executed by a processor, cause the processor to perform operations comprising:
assigning operational parameters to each one of a plurality of profiles, respectively, wherein the one or more operational parameters control operations of a navigation device;
presenting, at the navigation device, a plurality of options to select one of the plurality of profiles without assistance from a computer device that is communicatively coupled to the navigation device as a selected profile;
storing the selected profile;
adjusting operations of the navigation device according to the one or more operational parameters of the selected profile to control operations of the navigation device while a software application is in use by the computer device, wherein the computer device controls the software application according to the operations of the navigation device configured according to the selected profile;
receiving from the computer device a sequence of accessory stimuli generated by one or more accessories communicatively coupled to the computer device, wherein the sequence corresponds to a macro;
associating the macro with one or more manipulations of the navigation device;
transmitting the sequence to the software application responsive to detecting the one or more manipulations;
receiving a resolution change request to change a resolution setting of the navigation device; and
adjusting the resolution setting of the navigation device according to the resolution change request.

8. The non-transitory computer-readable storage medium of claim 7, wherein the navigation device comprises one of a computer mouse, a joystick, a gaming console controller, a keyboard, or a headset.

9. The non-transitory computer-readable storage medium of claim 7, wherein the one or more operational parameters comprise at least one of:
a movement count parameter affecting operations of the navigation device;
a line straightening parameter affecting operations of the navigation device;
a jitter correction parameter affecting operations of the navigation device;
a navigation acceleration parameter affecting operations of the navigation device;
a control frequency parameter that affects operations of the navigation device by adjusting a frequency of reports sent to the computing device;
a speed setting parameter that affects operations of the navigation device by adjusting a scrolling speed of the navigation device; or
any combination thereof.

10. The non-transitory computer-readable storage medium of claim 7, comprising computer instructions which when executed by the at least one processor cause the processor to perform operations comprising:
detecting a tactile selection of one of a plurality of buttons of the navigation device; and
transitioning between at least two movement count resolutions responsive to the detection, wherein each of the at least two movement count resolutions determine a movement count reported to the computing device communicatively coupled to the navigation device.

11. The non-transitory computer-readable storage medium of claim 7, wherein the navigation device comprises a headset,
wherein the presenting at the navigation device comprises presenting the plurality of options according to a visual presentation or an audible presentation, and
wherein the detecting the selection of the selected profile comprises detecting the selection of the selected profile according to a voice command.

12. A method, comprising:
assigning, by a navigation device comprising a processor, one or more operational parameters to a first profile of a plurality of profiles, wherein the one or more operational parameters control operations of the navigation device;
presenting, by the navigation device, a menu to select one of the plurality of profiles;
detecting, by the navigation device, a selection of the first profile;
configuring, by the navigation device, operations of the navigation device according to the first profile;
generating, by the navigation device, navigation stimuli for controlling navigation activities in a graphical user interface presented by a software application while being executed by a computing device communicatively coupled to the navigation device;
receiving, by the navigation device, from the computing device a sequence of accessory stimuli generated by one or more accessories communicatively coupled to the computing device, wherein the sequence corresponds to a macro;
associating, by the navigation device, the macro with one or more input functions of the navigation device;
transmitting, by the navigation device, the sequence to the software application responsive to a manipulation of the one or more input functions;
monitoring, by the navigation device, for a resolution change request to change a resolution setting of the navigation device; and
adjusting, by the navigation device, the resolution setting of the navigation device according to the resolution change request.

13. The method of claim 12, wherein the navigation device comprises one of a computer mouse, a joystick, a gaming console controller, a keyboard, or a headset.

14. The method of claim 12, wherein the one or more operational parameters comprise at least one of:
a movement count parameter affecting operations of the navigation device;
a line straightening parameter affecting operations of the navigation device;
a jitter correction parameter affecting operations of the navigation device;
a navigation acceleration parameter affecting operations of the navigation device;
a control frequency parameter that affects operations of the navigation device by adjusting a frequency of reports sent to the computing device;
a speed setting parameter that affects operations of the navigation device by adjusting a scrolling speed of the navigation device; or
any combination thereof.

15. The method of claim 12, wherein the presenting comprises presenting the menu as one of an audible presentation or a visual presentation.

\* \* \* \* \*

UNITED STATES PATENT AND TRADEMARK OFFICE
CERTIFICATE OF CORRECTION

PATENT NO. : 9,454,297 B2
APPLICATION NO. : 12/483678
DATED : September 27, 2016
INVENTOR(S) : Jacob Wolff-Petersen, Tino Soelberg and Jonas Bollack It is certified that error appears in the above-identified patent and that said Letters Patent is hereby corrected as shown below:

On the Title Page

Item [75], insert as third named inventor --Jonas Bollack, Berlin (DE)--

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*